(12) United States Patent
Choi et al.

(10) Patent No.: US 11,117,284 B2
(45) Date of Patent: Sep. 14, 2021

(54) LINE CATCHER TYPE WATERJET CUTTING APPARATUS WITH MULTIPLE DRIVING UNITS

(71) Applicant: TOPS CO., LTD., Gimhae-si (KR)

(72) Inventors: Chang Hoon Choi, Gimhae-si (KR); Tae Il Cho, Gimhae-si (KR); Min Soo Song, Gimhae-si (KR); Hyun Jung Kwon, Gimhae-si (KR); Jang Sung Kim, Gimhae-si (KR); Dong Jun Park, Gimhae-si (KR); Mohamed Ahmed Hashish, Bellevue, WA (US)

(73) Assignee: TOPS CO., LTD., Gimhae-si (KR)

( * ) Notice: Subject to any disclaimer, the term of this patent is extended or adjusted under 35 U.S.C. 154(b) by 0 days.

(21) Appl. No.: 16/751,702

(22) Filed: Jan. 24, 2020

(65) Prior Publication Data
US 2021/0129368 A1    May 6, 2021

(30) Foreign Application Priority Data

Nov. 6, 2019    (KR) .......................... 10-2019-0140983

(51) Int. Cl.
*B23Q 5/34*    (2006.01)
*B26D 7/06*    (2006.01)
(Continued)

(52) U.S. Cl.
CPC .............. *B26D 7/0625* (2013.01); *B23Q 5/34* (2013.01); *B26D 5/38* (2013.01); *B26D 7/025* (2013.01);
(Continued)

(58) Field of Classification Search
CPC ........ B26D 7/0625; B26D 5/38; B26D 7/025; B26D 2007/011; B23Q 5/34; B26F 3/008
(Continued)

(56) References Cited

U.S. PATENT DOCUMENTS 4,608,936 A * 9/1986 Ball ....................... B26D 1/185
112/104
5,003,729 A * 4/1991 Sherby ............... B23Q 11/0032
451/365
(Continued)

FOREIGN PATENT DOCUMENTS

JP    H01-146700 A    6/1989
JP    H03-178800 A    8/1991
(Continued)

*Primary Examiner* — Kenneth E Peterson
*Assistant Examiner* — Liang Dong
(74) *Attorney, Agent, or Firm* — Paratus Law Group, PLLC

(57) ABSTRACT

Disclosed is a line catcher-type waterjet cutting apparatus in which a workpiece is subjected to the waterjet processing in a state of being clamped by a workpiece edge clamping device and a separate driving unit for the workpiece edge clamping device is provided, and in which the workpiece is clamped by the workpiece edge clamping device during the waterjet processing, while the workpiece is easily decoupled from the workpiece edge clamping device after the waterjet processing is completed, so that the waterjet processing is carried out while reciprocally conveying the workpiece in an X-direction, thereby increasing the processing accuracy of the waterjet processing and easily automating the waterjet processing.

5 Claims, 10 Drawing Sheets

(51) Int. Cl.
*B26D 5/38* (2006.01)
*B26D 7/02* (2006.01)
*B26F 3/00* (2006.01)
*B26D 7/01* (2006.01)

(52) U.S. Cl.
CPC ........ *B26F 3/008* (2013.01); *B26D 2007/011* (2013.01)

(58) Field of Classification Search
USPC .................................................. 83/206, 277
See application file for complete search history.

(56) References Cited

U.S. PATENT DOCUMENTS

2008/0168876 A1\* 7/2008 Kilian ...................... B26D 7/20
83/424
2015/0292154 A1\* 10/2015 Zheng ...................... D21F 9/04
162/226

FOREIGN PATENT DOCUMENTS

| JP | H05-245758 A | 9/1993 |
| JP | 2019-171527 A | 10/2019 |

\* cited by examiner

LINE CATCHER TYPE WATERJET CUTTING APPARATUS WITH MULTIPLE DRIVING UNITS

CROSS REFERENCE TO RELATED APPLICATION

The present application claims priority to Korean Patent Application No. 10-2019-0140983, filed on Nov. 6, 2019, the entire contents of which is incorporated herein for all purposes by this reference.

BACKGROUND

Field of the Invention

The present invention relates to a line catcher-type waterjet cutting apparatus.

Description of the Related Art

Generally, waterjet cutting is a processing method of cutting a workpiece by ejecting pressurized water or a pressurized mixture of water and an abrasive onto a workpiece.

Waterjet processing has the advantages in that heat is not generated during processing so that a workpiece is not thermally deformed, that few burrs remain after the completion of the process, and that it is applicable to any kind of workpiece material.

Waterjet cutting may be applied to a workpiece, such as corrugated board, disposable diapers, sand paper, rubber products, urethane products, tires, leather products (natural and synthetic), textiles, nylon, vinyl, other plastics, FRP, Kevlar, printed boards, other composite materials, glass, fiber glass, ceramic, wood, plywood, asbestos, gypsum board, tile, other building materials, concrete, cement, asphalt, iron, nonferrous metals, stainless steel, other special metals, frozen meat, etc.

In the meantime, a conventional line catcher-type waterjet cutting apparatus including a carry-in belt-type conveyor unit loading and reciprocally conveying a plate-type workpiece in an X-direction, a carry-out belt-type conveyor unit disposed on a rear side of the carry-in belt-type conveyor unit, with a processing interval extending in a y-direction, to load and reciprocally convey the workpiece in the X-direction, a ejection nozzle disposed above the processing spacing to eject a pressurized fluid onto the workpiece for processing the workpiece, a ejection nozzle driver unit driving the ejection nozzle to reciprocally move in the y-direction, and a catcher disposed below the ejection nozzle to receive the pressurized fluid ejected from the ejection nozzle has been known.

A conventional technique related to a line catcher-type waterjet cutting apparatus has been disclosed in Japanese Patent Application Publication No. H 03-178800 (published on Aug. 2, 1991), Japanese Patent Application Publication No. H 01-146700 (published on Jun. 8, 1989).

Such a line catcher-type waterjet cutting apparatus requires that the workpiece be loaded on the carry-in and carry-out conveyor units and reciprocally conveyed in the X-direction. However, the belt-driven configuration has a problem in that it is difficult to implement a precise motion speed of the conveyor units and thus the workpiece thereon in the X-direction due to slippage of a belt, or the like, thereby making it difficult to implement the precise processing of the workpiece.

Due to such a problem, as the importance of precision in waterjet processing is emphasized, the line catcher-type waterjet cutting apparatus is being neglected in the market.

DOCUMENTS OF RELATED ART (Patent Document 1) Japanese Patent Application Publication No. Hei 3-178800 (published on Aug. 2, 1991)
(Patent Document 2) Japanese Patent Application Publication No. Hei 1-146700 (published on Jun. 8, 1989)

SUMMARY

Accordingly, the present invention has been made keeping in mind the above problems occurring in the related art, and an objective of the present invention is to provide a line catcher-type waterjet cutting apparatus in which a workpiece is subjected to waterjet processing in a state of being clamped by a workpiece edge clamping device and a separate driving unit for driving the workpiece edge clamping device is provided, so that the waterjet processing can be carried out while reciprocally conveying the workpiece in an X-direction, thereby increasing the processing accuracy of the line catcher-type waterjet apparatus.

Furthermore, another object of the present invention is to provide a line catcher-type waterjet cutting apparatus in which a workpiece is clamped by a workpiece edge clamping device during the waterjet processing, while the workpiece is easily decoupled from the workpiece edge clamping device after the waterjet processing is completed, thereby easily automating loading of a workpiece, removal of the processed workpiece, and disposal of a processing waste.

In order to achieve the above objectives, according to one aspect of the present invention, there is provided a line catcher-type waterjet cutting apparatus with multiple driving units, comprising a carry-in belt-type conveyor unit serving to load a plate-type workpiece thereon and reciprocally move the workpiece in an X-direction, a carry-out belt-type conveyor unit disposed on a rear side of the carry-in belt-type conveyor unit with a processing interval extending in a Y-direction interposed therebetween to load the workpiece thereon and reciprocally move the workpiece in the X-direction, an ejection nozzle disposed above the processing interval to eject a pressurized fluid to process the workpiece, an ejection nozzle driving unit serving to drive the ejection nozzle to reciprocally move in the Y-direction, and a catcher provided in a lower portion of the ejection nozzle to receive the pressurized fluid ejected from the ejection nozzle, the apparatus comprising: a workpiece edge clamping device serving to clamp edges of the workpiece, the workpiece edge clamping device comprising a rectangular frame having a workpiece input space in its center and a plurality of clamping members provided on an inner edge of the rectangular frame to clamp the edges of the workpiece put into the workpiece input space; and a clamping device driving unit serving to driving the workpiece edge clamping device to reciprocally move in the X-direction, wherein some of the plurality of clamping members are vertically movable clamping members provided inside the rectangular frame adjacent to the carry-out belt-type conveyor unit, wherein the vertically movable clamping members is configured to clamp the edges of the workpiece when moved downwards, and to form a discharge space between the vertically movable clamping member and the carry-out belt-type conveyor unit to allow the workpiece to escape from the rectangular frame therethrough when moved upwards.

In an embodiment, the clamping device driving unit may include: a screw rotatably supported by a base frame while extending in the X-direction; a screw driving motor driving the screw to rotate; and a nut member provided on the rectangular frame in a way as to be ball screw-coupled to the screw to convert a rotational motion of the screw to a linear motion of the rectangular frame.

In an embodiment, the carry-in belt-type conveyor unit may be coupled to the rectangular frame of the workpiece edge clamping device to move synchronously with the workpiece edge clamping device, wherein the carry-out belt-type conveyor unit may be provided with a carry-out driving unit serving to only drive the carry-out belt-type conveyor unit so that the carry-out belt-type conveyor unit can be operable independently of the carry-in belt-type conveyor unit.

In an embodiment, the vertically movable clamping member may include: a vertically driven cylinder provided to the rectangular frame; and a vertically movable clamping bracket coupled to the vertically driven cylinder so as to be vertically movable with the operation of the vertically driven cylinder.

In an embodiment, the plurality of clamping members may further include: a fixing clamping member having a fixing clamping bracket provided inside the rectangular frame; and a horizontally movable clamping member having a horizontally driven cylinder provided inside the rectangular frame and a horizontally movable clamping bracket coupled to the horizontally driven cylinder so as to be horizontally movable with the operation of the horizontally driven cylinder.

According to the present invention, a workpiece can be subjected to the waterjet processing in a state of being clamped by a workpiece edge clamping device and a separate driving unit for driving the workpiece edge clamping device is provided, so that the waterjet processing can be carried out while reciprocally conveying the workpiece in an X-direction, thereby increasing the processing accuracy of the line catcher-type waterjet apparatus.

Furthermore, a workpiece can be clamped by a workpiece edge clamping device during the waterjet processing, while the workpiece can be easily decoupled from the workpiece edge clamping device after the waterjet processing is completed, thereby easily automating loading of a workpiece, removal of the processed workpiece, and disposal of a processing waste.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION

Figure 1:
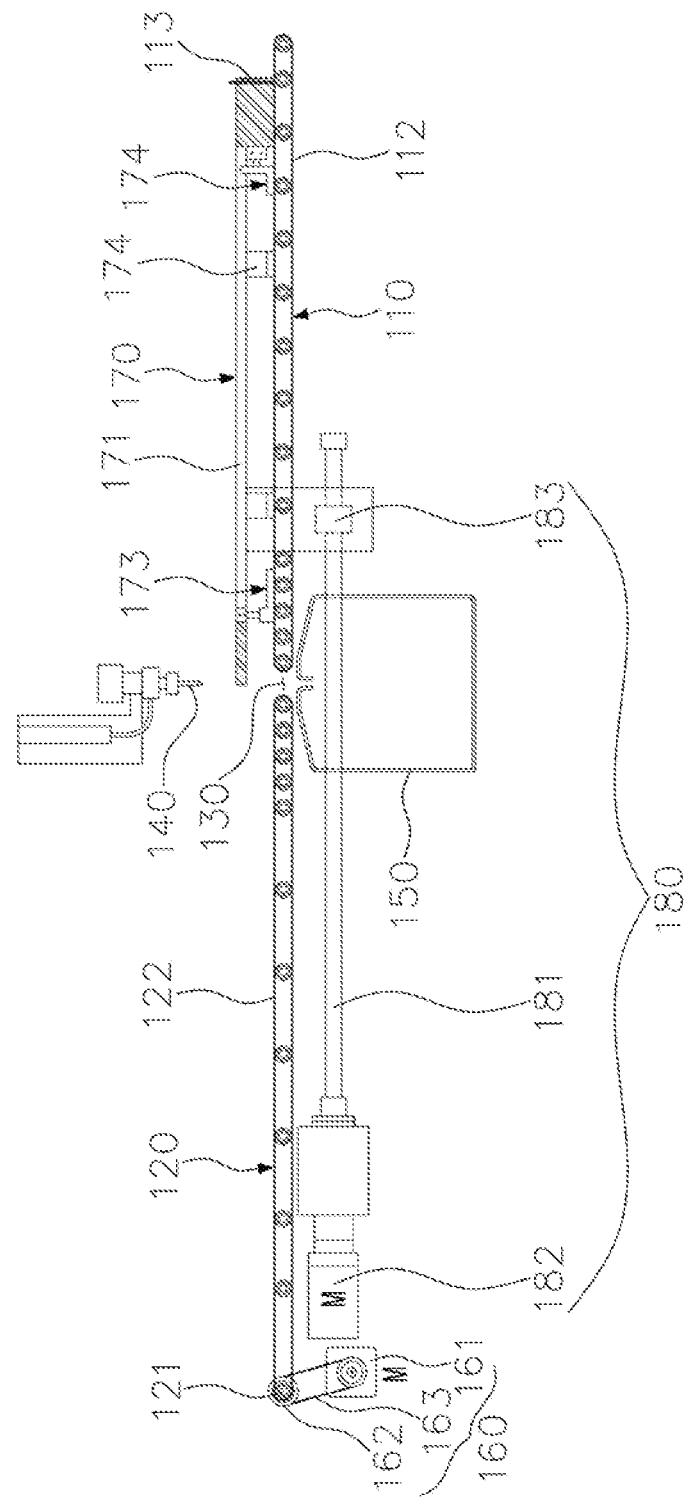
FIG. 1 is a conceptual diagram of a line catcher-type waterjet cutting apparatus according to an embodiment of the present invention.

Hereinbelow, exemplary embodiments of the present invention will be described in detail with reference to the accompanying drawings to allow those skilled in the art to easily implement the embodiments. However, the present invention is not limited to those embodiments, but may be implemented into other forms. In the drawings, parts irrelevant to the description are omitted for simplicity of explanation, and like reference numerals designate like parts throughout the specification.

Throughout the specification, the expression describing that an element "includes" a component means that the element may further include other configurations unless the context clearly indicates otherwise.

Figure 2:
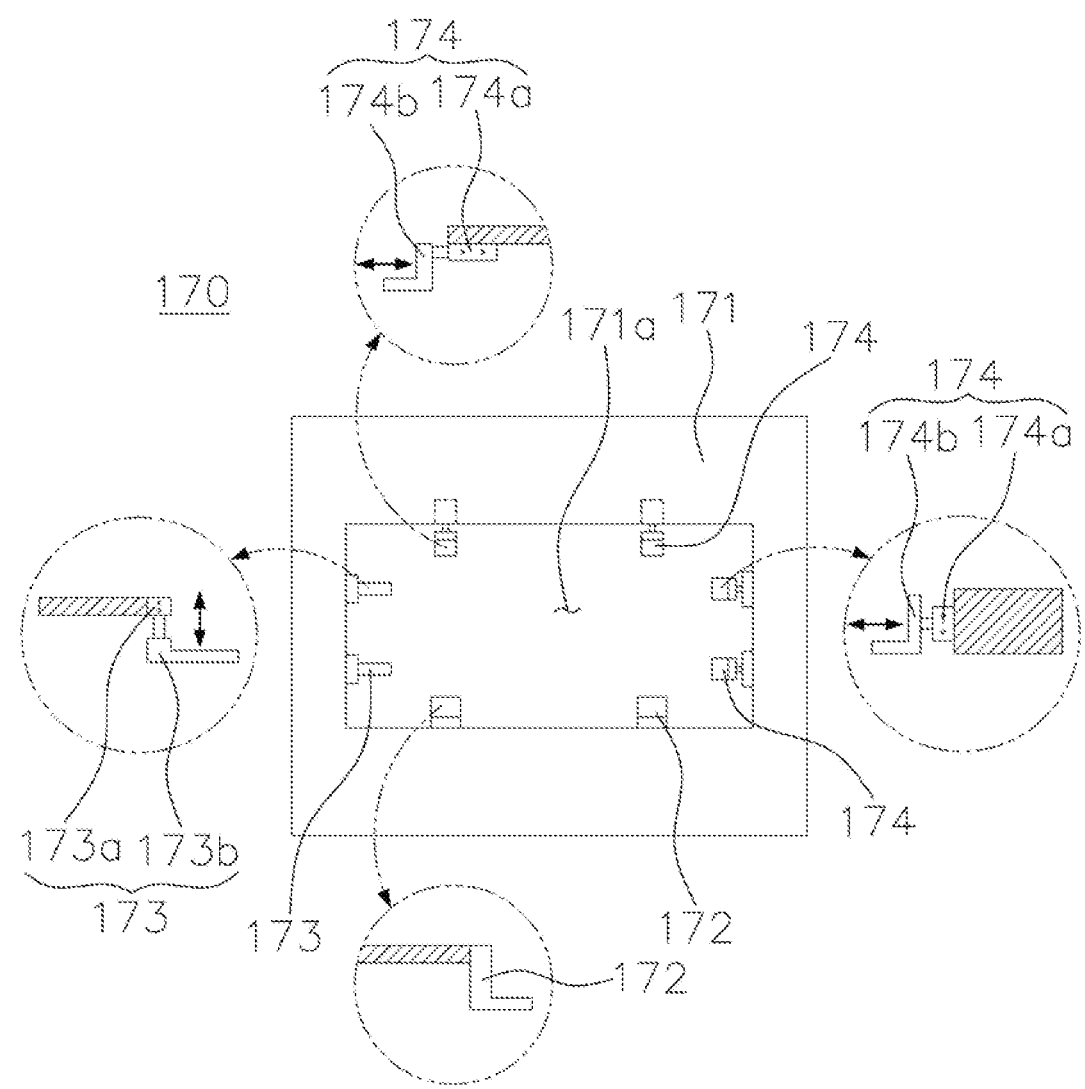
FIG. 2 is a plan view of a workpiece edge clamping device of FIG. 1, with side elevation views of portions of the workpiece edge clamping device added.
Figure 3:
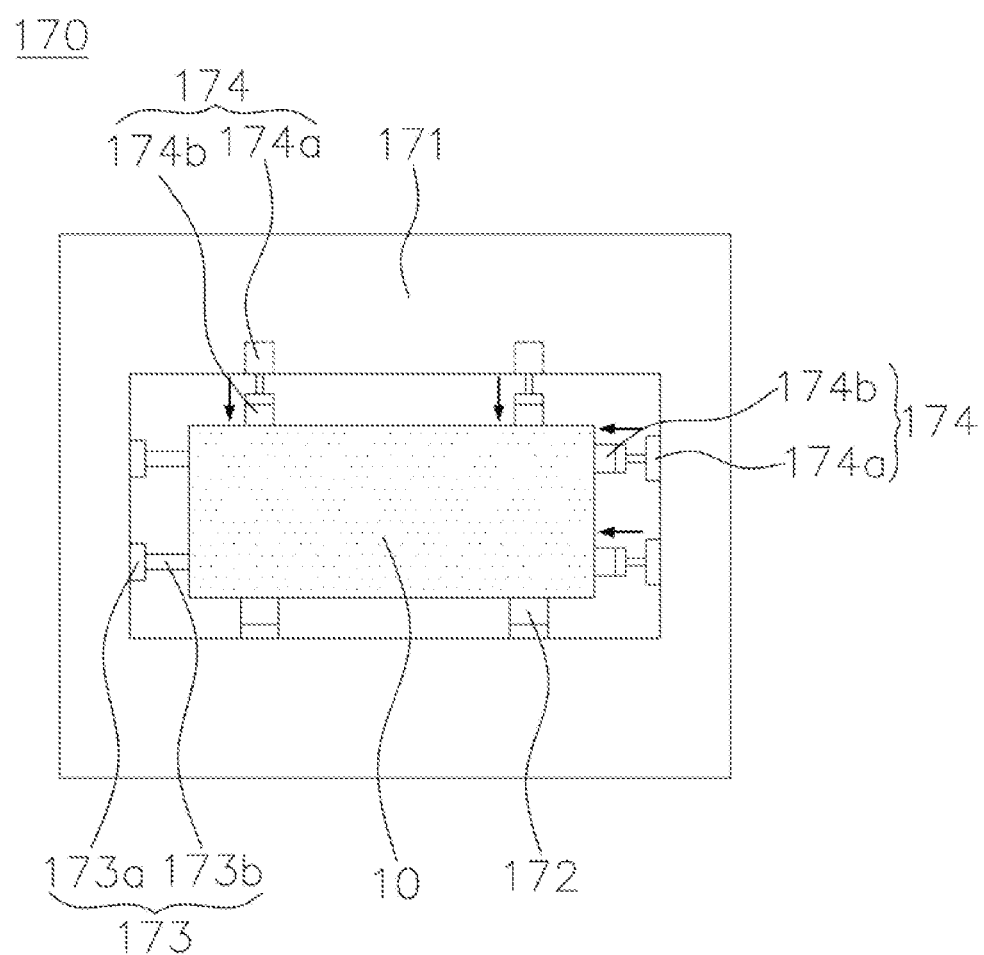
FIG. 3 is a plan view of the workpiece edge clamping device of FIG. 2 in which a workpiece is loaded.
Figure 4:
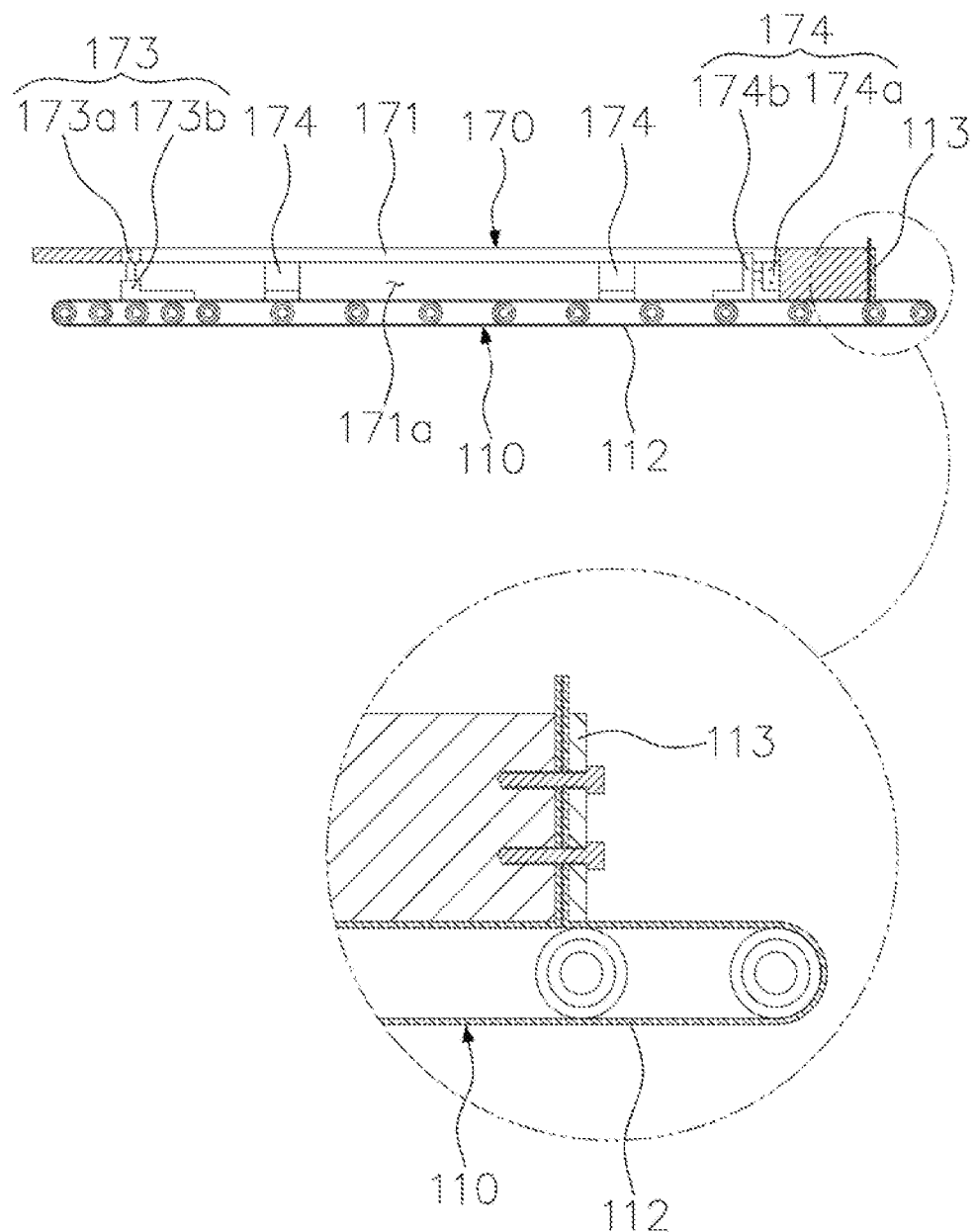
FIG. 4 is an enlarged view of the workpiece edge clamping device and carry-in belt-type conveyor unit illustrated in FIG. 1.

FIG. 1 is a conceptual diagram of a line catcher-type waterjet cutting apparatus according to an embodiment of the present invention, FIG. 2 is a plan view of a workpiece edge clamping device of FIG. 1, with side elevation views of portions of the workpiece edge clamping device added, FIG. 3 is a plan view of the workpiece edge clamping device of FIG. 2 in which a workpiece is loaded, FIG. 4 is an enlarged view of the workpiece edge clamping device and carry-in belt-type conveyor unit illustrated in FIG. 1, and FIGS. 5 to 14 are views sequentially illustrating the operating state of the waterjet cutting apparatus illustrated in FIG. 1.

FIG. 2 illustrates the shape and operation concept of each clamping member in an enlarged view, together with a plan view of the workpiece edge clamping device.

First, the basic structure of an embodiment according to the present invention will be described with reference to FIG. 1.

A carry-in belt-type conveyor unit 110 and a carry-out belt-type conveyor unit 120 are provided on a base frame (not shown).

The carry-in belt-type conveyor unit 110 serves to load a plate-type workpiece 10 thereon and reciprocally convey the workpiece in an X-direction, and the carry-out belt-type conveyor unit 120 also serves to load the plate-type workpiece 10 thereon and reciprocally convey the workpiece 10 in the X-direction.

In this embodiment, although the workpiece 10 may be a glass plate, the material and shape of the workpiece 10 may be diversely changed.

The carry-in belt-type conveyor unit 110 and the carry-out belt-type conveyor unit 120 each have a plurality of rollers around which a belt is wound.

As described above, since the configuration of the carry-in belt-type conveyor unit 110 and the carry-out belt-type conveyor unit 120 using the rollers and the belts belongs to a very conventional technique, a detailed description thereof will be omitted.

The carry-out belt-type conveyor unit 120 is disposed on a rear side of the carry-in belt-type conveyor unit 110 with a processing interval 130 interposed therebetween.

The processing interval 130 extends in a Y-direction orthogonal to the X-direction which is the conveying direction of the carry-in belt-type conveyor unit 110.

An ejection nozzle 140 is disposed above the processing interval 130.

The ejection nozzle 140 serves to eject a pressurized fluid to process the workpiece 10. The pressurized fluid may be water or water mixed with abrasives.

The ejection nozzle 140 cuts the workpiece 10 while moving in the Y-direction orthogonal to the X-direction, that is, in the extension direction of the processing interval 130.

An ejection nozzle driving unit (not shown) is provided to move the ejection nozzle 140 as described above.

The ejection nozzle driving unit may drive the ejection nozzle 140 to reciprocate in the Y-direction. In addition, the ejection nozzle driving unit may drive the ejection nozzle 140 to reciprocate in the vertical direction.

Although the ejection nozzle driving unit is generally provided in a gantry type in the base frame, in some cases, the ejection nozzle driving unit may be implemented by a robot or the like.

A catcher 150 is provided below the ejection nozzle 140, i.e., below the processing interval 130.

The catcher 150 serves to receive a pressurized fluid ejected from the ejection nozzle 140, and is usually provided in the form of a tank. In some cases, the catcher 150 may be implemented to reciprocate in the Y-direction together with the ejection nozzle 140.

The structure of the carry-in belt-type conveyor unit 110, the carry-out belt-type conveyor unit 120, the ejection nozzle 140, the ejection nozzle driving unit, and the catcher 150 as described above can be applied in a wide variety of ways.

The carry-out belt-type conveyor unit 120 consists of a plurality of rollers and a carry-out belt 122 which wraps these rollers. The roller located on one side of the plurality of rollers is a driving roller 121 for moving the carry-out belt 122 and the remaining rollers are guide rollers. That is, the carry-out belt 122 moves along the driving roller 121 by the rotation of the driving roller 121, and the guide rollers guide the movement of the carry-out belt 122.

A carry-out driving unit 160 is provided for the operation of the carry-out belt-type conveyor unit 120 as described above.

In the present embodiment, the carry-out driving unit 160 includes a carry-out driving motor 161 provided on the base frame, a driven pulley 162 mounted to the driving roller 121 of the carry-out belt-type conveyor unit 120, and a timing belt 163 for transmitting the rotational force of the carry-out driving motor 161 to the driven pulley 162.

Therefore, when the carry-out driving motor 161 rotates, the rotational force of the carry-out driving motor is transmitted to the driven pulley 162 via the timing belt 163, so that the driving roller 121 and the driven pulley 162 mounted to the driving roller rotate together, and the belt 122 reciprocally moves.

The carry-out driving unit 160 as described above is used to drive only the carry-out belt-type conveyor unit 120 and is thus disposed independently of the carry-in belt-type conveyor unit 110.

Therefore, the carry-out belt-type conveyor unit 120 and the carry-in belt-type conveyor unit 110 may operate independently of each other.

On the other hand, the carry-in belt-type conveyor unit 110 is composed of a plurality of guide rollers and a carry-in belt 112 surrounding them. That is, there is no separate driving roller in the carry-in belt-type conveyor unit 110.

A workpiece edge clamping device 170 is provided on the carry-in belt-type conveyor unit 110 to clamp an edge of a workpiece.

The workpiece edge clamping device 170 includes a rectangular frame 171 and a plurality of clamping members.

As illustrated in FIGS. 2 and 4, the rectangular frame 171 has a workpiece input space 171a in its center for a workpiece.

The shape of the workpiece input space 171a is also rectangular in a plan view.

As illustrated in the enlarged view of FIG. 4, a carry-in belt 112 is coupled to an outer edge of the rectangular frame 171. That is, the carry-in belt 112 forms a closed curve surrounding the plurality of guide rollers, and both ends of the carry-in belt 112 are coupled to the outer edge of the rectangular frame 171.

That is, when a belt holder 113 is bolted to the outer edge of the rectangular frame 171, both ends of the carry-in belt 112 are fixedly inserted between the belt holder 113 and the rectangular frame 171.

By this structure, the carry-in belt-type conveyor unit 110 may move synchronously with the workpiece edge clamping device 170.

In the rectangular frame 171, the portion where the belt holder 113 is coupled (the right portion in FIG. 4) is loaded on the carry-in belt 112, but the other portion (such as the left portion in FIG. 4) is separated apart from the carry-in belt 112.

A plurality of clamping members provided on an inner edge of the rectangular frame 171 will be described with reference to FIG. 2.

The plurality of clamping members are provided on the inner edge of the rectangular frame 171 to clamp an edge of the workpiece 10 introduced into the workpiece input space 171a.

The clamping members used in this embodiment are fixing clamping members 172, vertically movable clamping members 173, and horizontally movable clamping members 174.

The fixing clamping member 172 includes an L-type fixing clamping bracket 172 provided inside the rectangular frame 171. The fixing clamping bracket 172 only clamps the workpiece 10 by supporting the edge of the workpiece 10 without being moved vertically or horizontally.

The vertically movable clamping member 173 has a vertically driven cylinder 173a coupled to the rectangular frame 171, and an L-type clamping bracket 173b coupled to the vertically driven cylinder 173a so as to be vertically movable with the operation of the vertically driven cylinder 173a.

In the present embodiment, two vertically movable clamping members 173 are provided inside the rectangular frame 171 adjacent to the carry-out belt-type conveyor unit 120.

When the vertically movable clamping bracket 173b is moved downward by the vertically driven cylinder 173a, the vertically movable clamping bracket 173b supports the edge of the workpiece 10 to clamp the workpiece 10.

Figure 11:
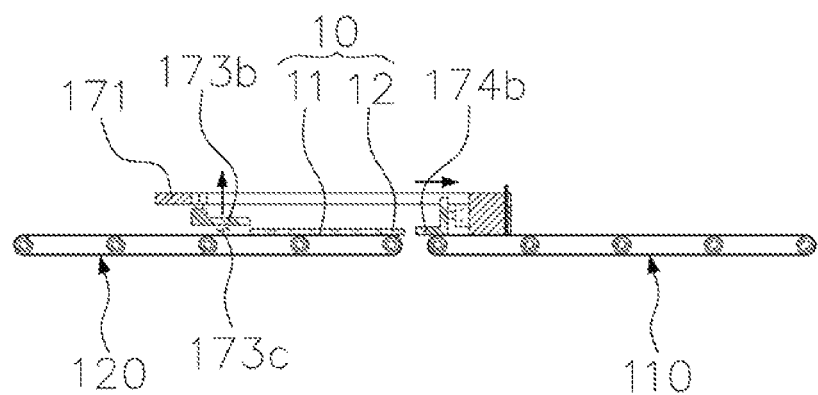

When the vertically movable clamping bracket 173b is moved upward by the vertically driven cylinder 173a, a discharge space 173c through which a workpiece can be discharged from the rectangular frame 171 may be formed between the vertically movable clamping bracket 173b and the carry-out belt 122 (see FIG. 11).

The horizontally movable clamping member 174 has a horizontally driven cylinder 174a coupled to the rectangular frame 171, and an L-type clamping bracket 174b coupled to the horizontally driven cylinder 174a so as to be horizontally movable with the operation of the horizontally driven cylinder 174a.

Therefore, when the workpiece 10 is introduced into the workpiece input space 171a of the rectangular frame 171 in the state of FIG. 2, and the horizontally clamping bracket 174*b* of the horizontally movable clamping member 174 moves towards the workpiece 10, the edge of the workpiece 10 is clamped by two fixing clamping members 172, four horizontally movable clamping members 174, and two vertically movable clamping members 173 as illustrated in FIG. 3.

According to embodiments, the number and arrangement of the fixing clamping members 172, the horizontally movable clamping members 174, and the vertically movable clamping members 173 may be diversely changed.

A clamping device driving unit 180 for driving the workpiece edge clamping device 170 as described above will now be described.

The clamping device driving unit 180 drives the workpiece edge clamping device 170 to reciprocally move in an X-direction.

The clamping device driving unit 180 includes a screw 181 rotatably supported by the base frame while extending in the X-direction, a screw driving motor 182 for rotating the screw 181, and a nut member 183 provided on the rectangular frame 171 so as to be ball screw-coupled to the screw 181.

That is, when the screw driving motor 182 rotates the screw 181, the rotational motion of the screw 181 is converted to the linear motion of the rectangular frame 171 by the nut member 183 ball screw-coupled to screw.

In addition, when the rectangular frame 171 reciprocates in the X-direction by the operation of the screw driving motor 182, the carry-in belt 112 of the carry-in belt-type conveyor unit 110 correspondingly reciprocates in the X-direction.

In this manner, the carry-in belt-type conveyor unit 110 moves synchronously with the workpiece edge clamping device 170.

As such, since the workpiece 10 can be reciprocally moved in the X-direction precisely by the operation of the screw driving motor 182, the processing accuracy of the waterjet cutting apparatus can be significantly improved.

The operation of this embodiment will be described with reference to FIGS. 5 to 14.

Figure 5:
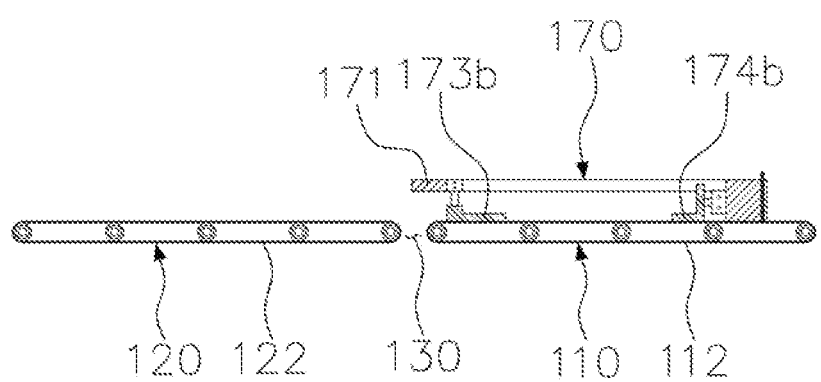
FIGS. 5 to 14 are views sequentially illustrating the operating state of the waterjet cutting apparatus illustrated in FIG. 1.

FIG. 5 is a state before the workpiece 10 is introduced. FIG. 2 is a plan view of the workpiece edge clamping device 170.

Figure 6:
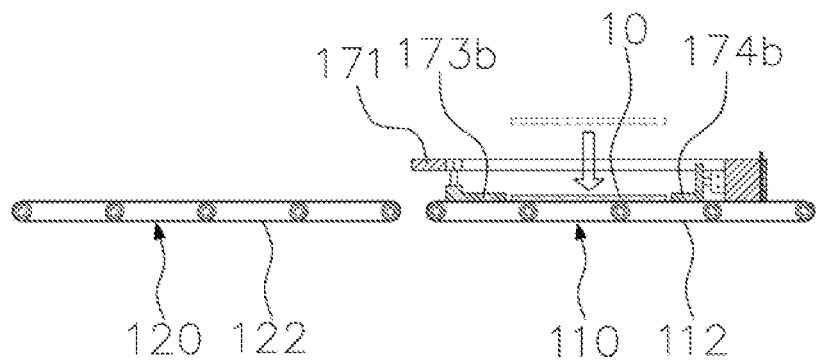

FIG. 6 is a state in which the workpiece 10 is introduced after the state of FIG. 5.

The workpiece 10 is introduced into the workpiece input space 171*a* of the rectangular frame 171 by a robot or the like. Thereby, the workpiece 10 is loaded on the carry-in belt-type conveyor unit 110. Here, the workpiece 10 is not yet clamped.

Figure 7:
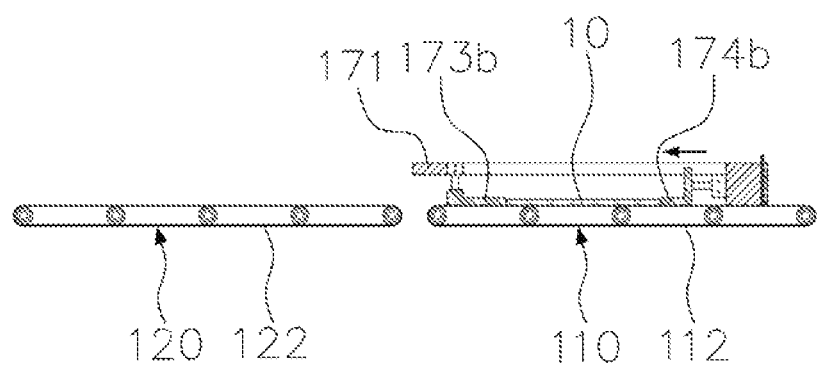

FIG. 7 is a state in which the workpiece 10 is clamped after the state of FIG. 6.

The workpiece 10 is clamped with the movement of the horizontally clamping bracket 174*b* of the horizontally clamping member 174 of the workpiece edge clamping device 170. FIG. 3 is a plan view of the workpiece edge clamping device 170 operated as such.

Figure 8:
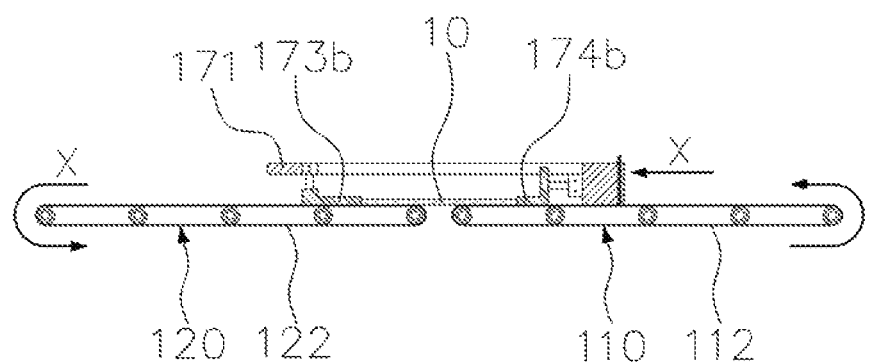

FIG. 8 is a state in which the workpiece 10 is located above the processing interval 130 after the state of FIG. 7.

When the workpiece edge clamping device 170 and the carry-in belt-type conveyor unit 110 are moved in the X-direction by the operation of the clamping device driving unit 180, and the carry-out belt-type conveyor unit 120 is driven and moved to a position above the processing interval 130 by the carry-out driving unit 160, being in a state immediately before the waterjet processing is performed.

Figure 9:
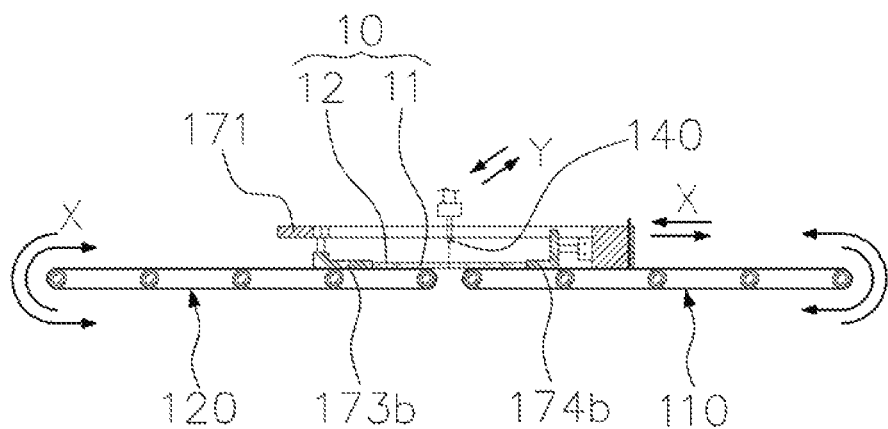

FIG. 9 is a state in which the waterjet processing is performed after the state of FIG. 8.

The clamping device driving unit 180 drives the workpiece edge clamping device 170 and the carry-in belt-type conveyor unit 110 to reciprocally move in the X-direction, and the carry-out driving unit 160 drives the carry-out belt-type conveyor unit 120 and the workpiece 10 loaded thereon to reciprocally move in the X-direction. Along with this, the ejection nozzle 140 performs the waterjet processing after being moved down and then reciprocating in the Y-direction with the operation of an ejection nozzle driving unit.

Thereby, the workpiece 10 is divided into a processed product 11 processed with the waterjet cutting processing and a residue 12 which is the remaining portion except for the processed product 11.

In addition, since the workpiece 10 can be reciprocally moved in the X-direction precisely by the screw driving motor 182, the processing accuracy can be significantly improved.

When the waterjet processing is completed, the ejection nozzle 140 is moved upward by the ejection nozzle driving unit so as not to interfere with the transfer of the rectangular frame 171.

Figure 10:
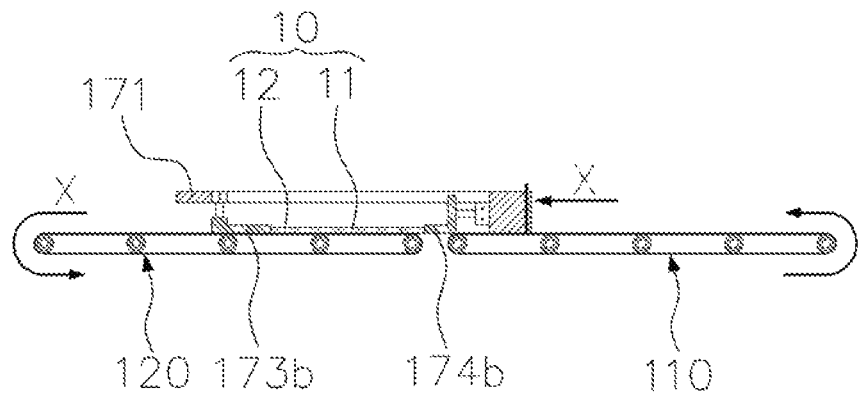

FIG. 10 is a state in which the workpiece 10 is transferred to the carry-out belt-type conveyor unit 120 after the state of FIG. 9.

The clamping device driving unit 180 drives the workpiece edge clamping device 170 and the carry-in belt-type conveyor unit 110 to move in the X-direction, and the carry-out driving unit 160 drives the carry-out belt-type conveyor unit 120 to move in the X-direction so that the workpiece 10 is in a state of being loaded on the carry-out belt-type conveyor unit 120.

FIG. 11 illustrates a state in which the clamped state of the workpiece 10 is released after the state of FIG. 10.

The vertically movable clamping bracket 173*b* is moved upward by the vertically driven cylinder 173*a* of the vertically movable clamping member 173, and with the operation of the horizontally driven cylinder 174*a* of the horizontally movable clamping member 174, the horizontally movable clamping bracket 174*b* is moved in a direction away from the workpiece to release the clamped state of the workpiece 10.

In addition, a discharge space 173*c* through which the workpiece 10 may escape from the rectangular frame 171 is formed between the vertically movable clamping bracket 173*b* and the carry-out belt 122 with the upward movement of the vertically movable clamping bracket 173*b*.

Figure 12:
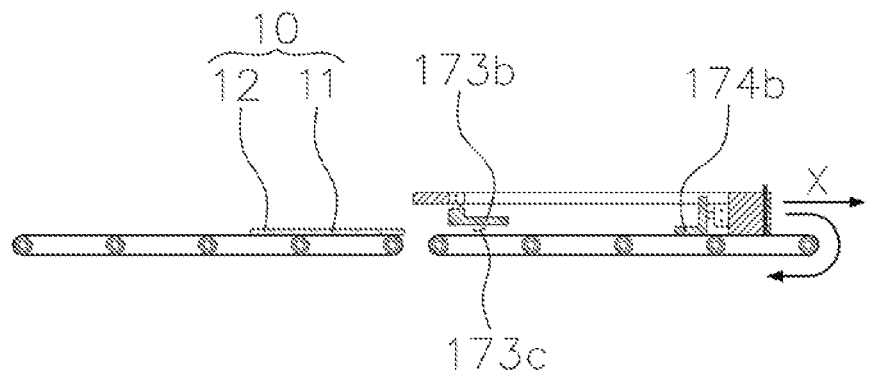

FIG. 12 illustrates a state in which the workpiece edge clamping device 170 is moved out of the workpiece 10 and onto the carry-in belt 112 after the state of FIG. 11.

That is, the clamping device driving unit 180 drives the workpiece edge clamping device 170 and the carry-in belt-type conveyor unit 110 to move in the X-direction (the right direction in FIG. 12), so that the workpiece edge clamping device 170 is moved out of the workpiece 10. In this case, the workpiece 10 does not interfere with the movement of the workpiece edge clamping device 170 due to the discharge space 173*c*.

Figure 13:
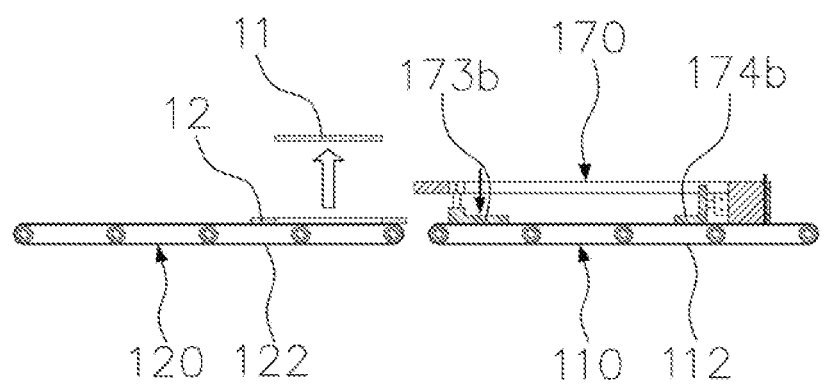

FIG. 13 illustrates the state in which the processed product 11 of the workpiece 10 is carried out after the state of FIG. 12.

In other words, the processed product 11 is carried out of the waterjet cutting apparatus by a robot or the like. Therefore, the residue 12, which is a portion of the workpiece 10 except the processed product 11, remains on the upper side of the carry-out belt 122.

Meanwhile, the vertically movable clamping bracket 173b is moved downward to a position to support another workpiece by the vertically driven cylinder 173a of the vertically movable clamping member 173 of the workpiece edge clamping device 170.

Figure 14:
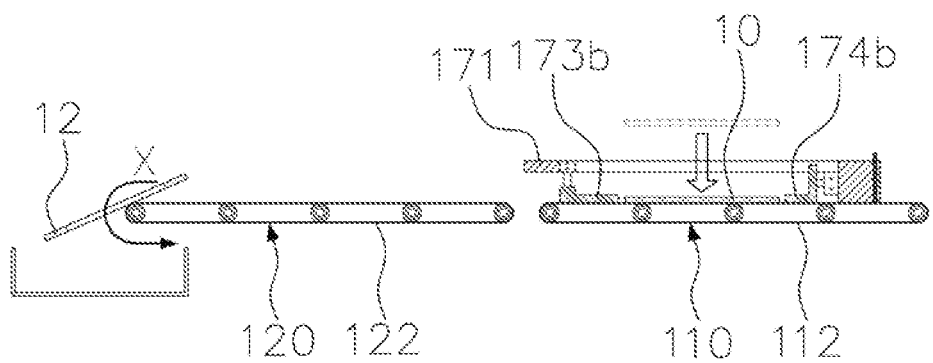

FIG. 14 illustrates the state in which the residue 12 is discarded to the outside after the state of FIG. 12.

The residue 12 is removed from the carry-out belt 122 while the carry-out belt-type conveyor unit 120 moves in the X-direction with the driving operation of the carry-out driving unit 160.

That is, in this embodiment, the removal of the residue 12 and the carry-out of the processed product 11 are performed in a completely different manner, and the removal of the residue 12 is performed by the carry-out belt-type conveyor unit 120, thereby easily automating the entire workpiece cutting processing.

On the other hand, a new workpiece 10 is put into the workpiece input space 171a of the rectangular frame 171 by a robot or the like. This is the same state as in FIG. 6.

Thereafter, the processes of FIGS. 7 to 14 are repeated.

Figure 15:
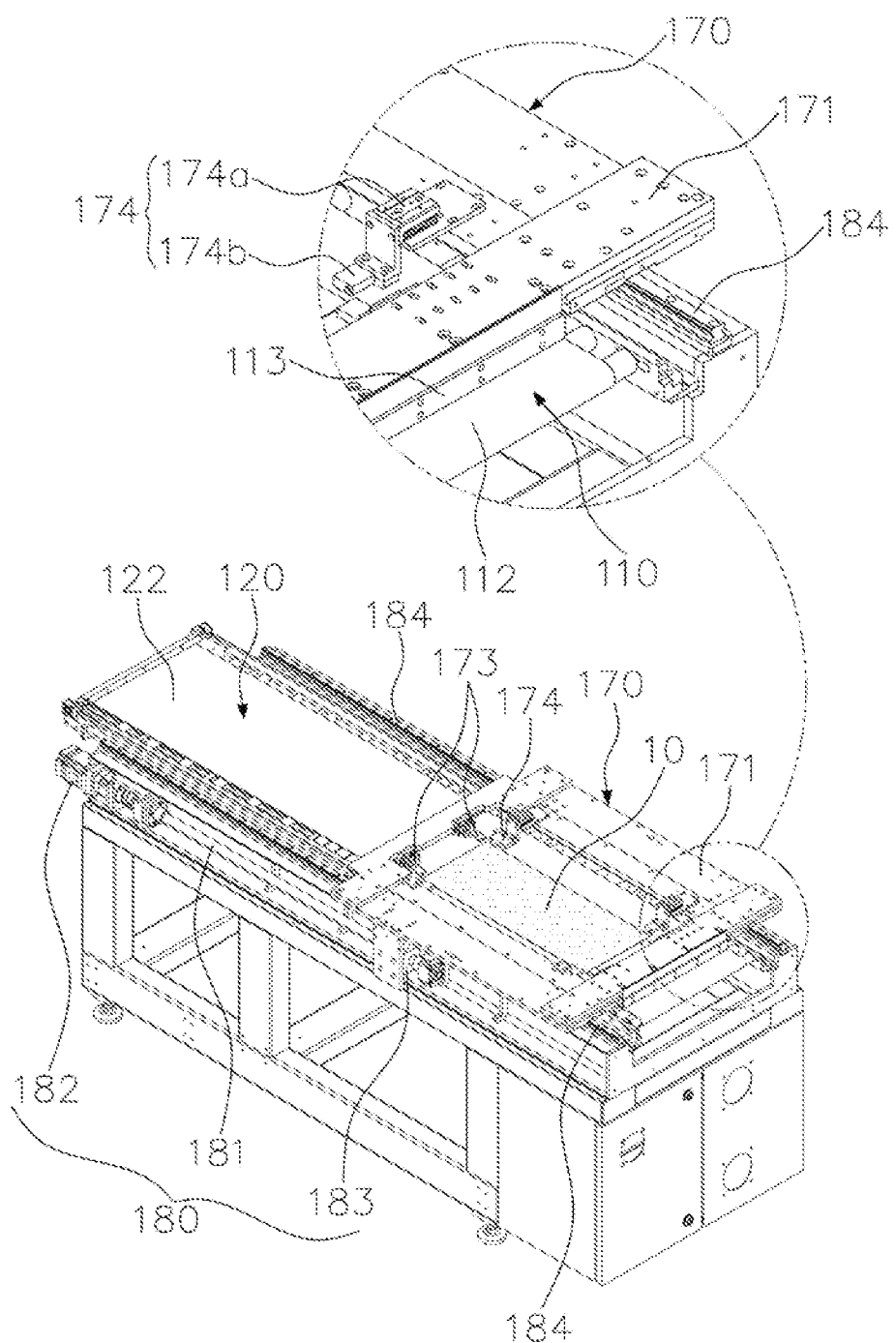
FIG. 15 is a perspective view of some configurations of a line catcher-type waterjet cutting apparatus according to another embodiment of the present invention.

FIG. 15 is a perspective view of some components of a line catcher-type waterjet cutting apparatus according to another embodiment of the present invention.

FIG. 15 illustrates a detailed configuration of a carry-in belt-type conveyor unit 110, a carry-out belt-type conveyor unit 120, a carry-out driving unit 160, a workpiece edge clamping device 170, a clamping device driving unit 180, and the like.

In addition, in the present embodiment, an LM guide 184 is provided on a base frame to guide the reciprocating movement of a rectangular frame 171 in the X-direction, and the rectangular frame 171 slides in the X-direction along the LM guide 184.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments described above are to be understood in all respects as illustrative and not restrictive. For example, each component described as a single type may be implemented in a distributed manner, and similarly, components described as distributed may be implemented in a combined form.

The scope of the present invention is defined by the following claims rather than the above description, and all changes or modifications derived from the meaning and scope of the claims and their equivalents should be construed as being included in the scope of the present invention.

What is claimed is:

1. A waterjet cutting apparatus comprising:
a carry-in belt conveyor configured to load a workpiece on the carry-in belt conveyor and reciprocally move the workpiece in an X-direction;
a carry-out belt conveyor placed at a rear side of the carry-in belt conveyor with a processing gap extending in a Y-direction interposed between the carry-in belt conveyor and the carry-out belt conveyor, the carry-out belt conveyor configured to load the workpiece on the carry-out belt conveyor and reciprocally move the workpiece in the X-direction;
an ejection nozzle disposed above the processing gap to eject a pressurized fluid toward the processing gap to process the workpiece, the ejection nozzle reciprocally movable in the Y-direction;
a catcher provided under the processing gap to receive the pressurized fluid ejected from the ejection nozzle and passing through the processing gap; and
a workpiece edge clamping device configured to clamp edges of the workpiece and reciprocally movable on the carry-in belt conveyor in the X-direction, the workpiece edge clamping device comprising:
a clamping frame having a workpiece input space through which the workpiece is loaded on the carry-in belt conveyor; and
a plurality of clamps provided on an inner edge of the clamping frame to clamp the edges of the workpiece put into the workpiece input space,
wherein the plurality of clamps includes a first clamp vertically movable in a Z-direction, and provided adjacent to the carry-out belt conveyor, wherein the first clamp is configured to clamp an edge of the workpiece when moved downwards and configured to form a discharge space between the first clamp and the carry-out belt conveyor to allow the workpiece to escape from the clamping frame through the discharge space when moved upwards.

2. The apparatus according to claim 1, wherein the workpiece edge clamping device is reciprocally driven in the X-direction by a clamping device driver which comprises:
a screw rotatably supported by a base frame while extending in the X-direction;
a screw driving motor driving the screw to rotate; and
a nut member provided on the clamping frame in a way as to be ball screw-coupled to the screw to convert a rotational motion of the screw to a linear motion of the clamping frame.

3. The apparatus according to claim 1, wherein the carry-in belt conveyor is coupled to the clamping frame of the workpiece edge clamping device to move synchronously with the workpiece edge clamping device,
wherein the carry-out belt conveyor is provided with a carry-out driver configured to only drive the carry-out belt conveyor so that the carry-out belt conveyor is operable independently of the carry-in belt conveyor.

4. The apparatus according to claim 1, wherein the first clamp comprises:
a vertically driven cylinder provided to the clamping frame; and
a vertically movable clamping bracket coupled to the vertically driven cylinder so as to be vertically movable with an operation of the vertically driven cylinder.

5. The apparatus according to claim 1, wherein the plurality of clamps further comprises:
a second clamp which is not movable and having a fixing clamping bracket fixed to the clamping frame; and
a third clamp having a horizontally driven cylinder provided at the clamping frame and a horizontally movable clamping bracket coupled to the horizontally driven cylinder so as to be horizontally movable with an operation of the horizontally driven cylinder.

* * * * *